Aug. 24, 1926.

H. D. GEYER 1,597,595

COMBINATION SPARK AND HEADLIGHT CONTROL FOR AUTOMOBILES

Filed June 5, 1924    2 Sheets-Sheet 1

Inventor
Harvey D. Geyer

By Spencer Sewall & Hardman
his Attorneys

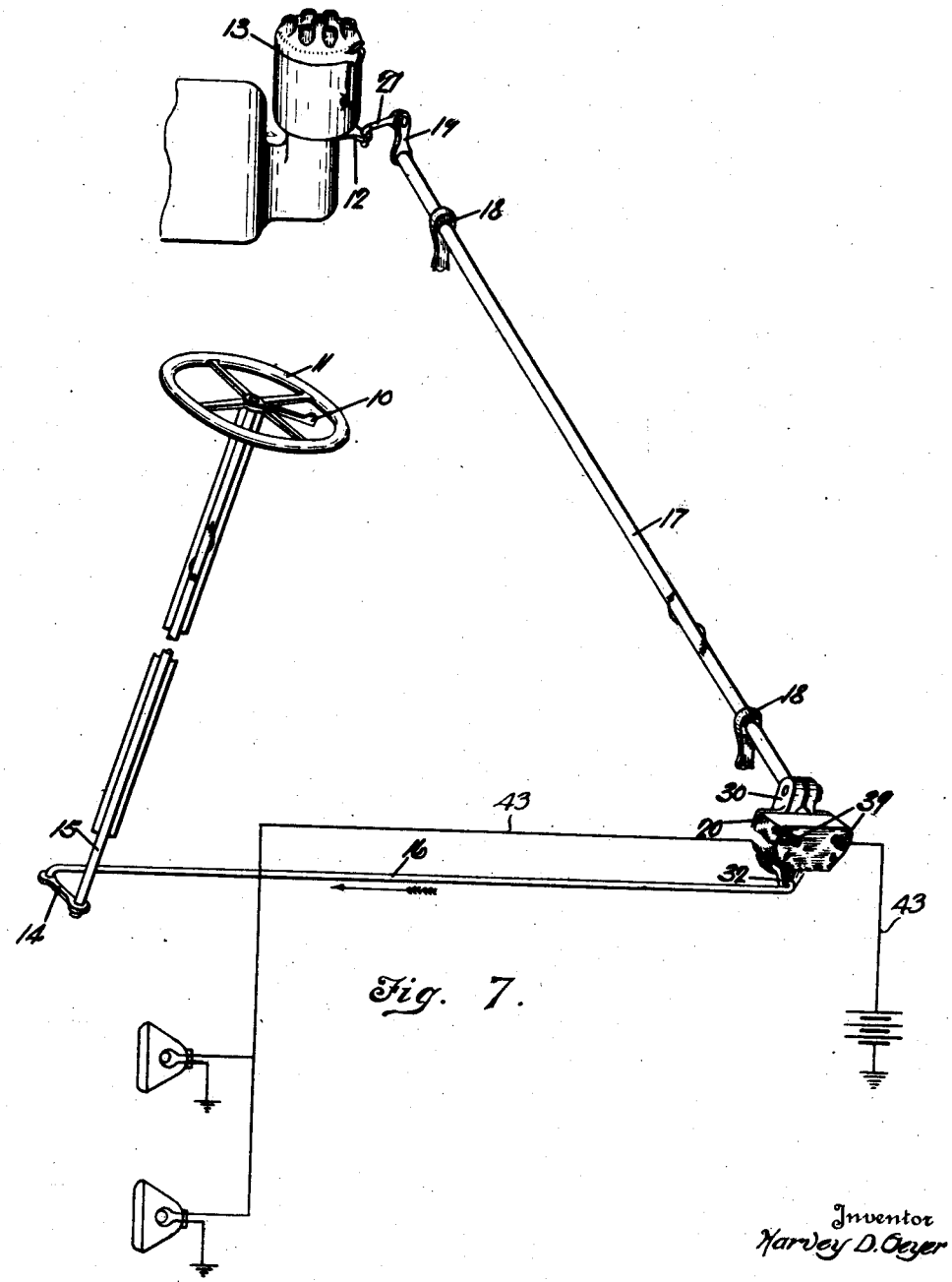

Patented Aug. 24, 1926.

1,597,595

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

COMBINATION SPARK AND HEADLIGHT CONTROL FOR AUTOMOBILES.

Application filed June 5, 1924. Serial No. 718,148.

This invention relates to a combination whereby the ordinary manual spark control in automotive vehicles is also used to serve the additional function of controlling the electric headlights on said vehicle.

An object of the invention is to provide common manual means for controlling both the spark of the engine of an automotive vehicle and an electric switch which in turn may control an electric light on said vehicle.

A more specific object is to provide means for accomplishing the above object in a very simple and efficient manner, and by which the light may be controlled by a relatively small motion of the manual operating means without affecting the spark.

Another object is to provide a compact unit which may be easily substituted for a part or parts on existing automobiles for accomplishing the above objects. It is thus seen that the invention may be built and sold as an accessory which may be very simply applied to existing automobiles and with only slight changes in the electric wiring.

Further objects and advantages of the present invention will be apparent from the following description, reference being had to the accompanying drawings, wherein a preferred form of embodiment of the present invention is clearly shown.

In the drawings:

Fig. 7 is a diagrammatic view showing how the switch unit may be connected up within the mechanical linkage from the manual spark lever to the spark timer.

In the drawings similar reference characters refer to similar parts throughout the several views.

Figure 1:
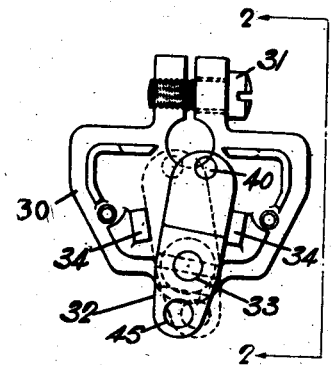
Fig. 1 is a view of the main part of the switch unit on line 1—1 of Fig. 2 but with the front cover removed.
Figure 2:
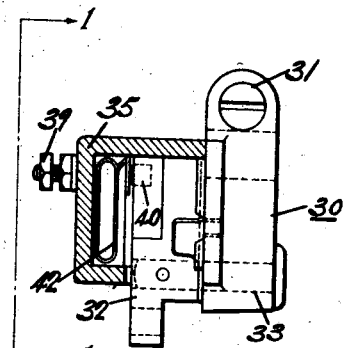
Fig. 2 is a side view showing the main part in elevation and the front cover in section on the center line thereof.

Numeral 10 designates the manually operated lever, ordinarily mounted on a steering wheel 11, for advancing and retarding the spark by moving the lever 12 associated with the distributor 13, all in a manner well known in the art. In the particular arrangement illustrated in Fig. 7, the manual lever 10 operates the lever 14 through the rotatable shaft 15 extending down the steering column. Lever 14 reciprocates the rod 16 which imparts a rotary motion to shaft 17 through the switch unit 20 which serves as a short lever attached to shaft 17. The shaft 17 is suitably mounted in stationary bearings 18 and operates the short lever 19 which is connected to the timer lever 12 through the link 21, as will be clearly understood from the drawings.

Figure 4:
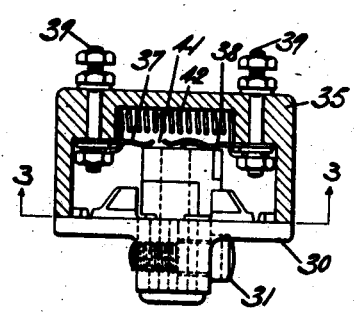
Fig. 4 is a bottom view of the switch unit but with the front cover plate shown in section.
Figure 3:
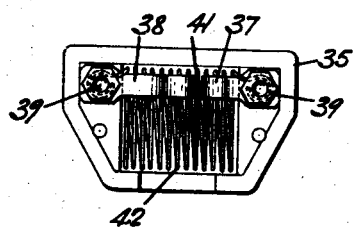
Fig. 3 is a view of the front cover plate and attached parts looking at it from the interior side thereof.
Figure 5:
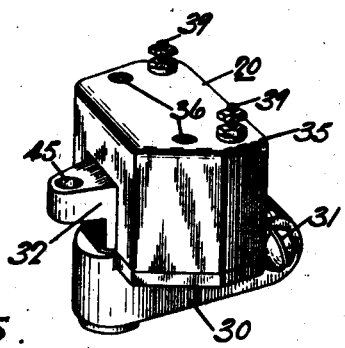
Fig. 5 is a perspective view of the complete switch unit.
Figure 6:
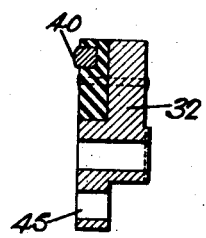
Fig. 6 is a detail view showing a section through the center line of the bridging contact member.

The switch unit 20 is in fact merely a short lever adapted to be rigidly attached to shaft 17 and having a small lost-motion movement therein, this lost-motion movement being utilized to operate the electric switch which is housed within the casing of the unit. The unit 20 comprises a small casting 30 having at one end thereof a clamping screw 31 for suitable attachment to the shaft 17 as clearly illustrated in the drawings. A small lever 32 is pivotally mounted upon the casting 30 and has a small angle of rotation about pin 33, this rotary movement being limited by the stops 34 preferably integral with the casting 30, as clearly shown in Fig. 1. A cup shaped front cover 35, preferably made of some suitable insulating material such as hard rubber or bakelite, is rigidly attached to casting 30 by means of the two screws 36 (see Fig. 5). Mounted upon the front cover 35 by means of the two binding posts 39 are two stationary spring contact members 37 and 38. The lever 32 carries an insulated bridging contact member 40 which is adapted in one position of lever 32 to bridge the gap 41 between the stationary contacts 37 and 38, and in another position of lever 32 to open the gap 41 between said contacts. A resistance coil 42 is connected between the two binding posts 39. When the bridging contact 40 closes the gap 41 the resistance coil 42 is short circuited and therefore cut out of the electric circuit connected to the binding posts 39 through the wires 43. When the bridging contact 40 is in the position shown in Fig. 4 the gap 41 is open and hence the current through wires 43 must pass through the resistance coil 42. One end of the small lever 32 projects from the housing formed by the cover 20 and is provided with a suitable aperture 45 by means of which the operating link 16 is attached thereto.

It will now be clear that the first small motion of link 16 will rotate lever 32 relative to lever 30 until it strikes one of the stops 34, after which the lever 30 will be rotated by a continued movement of link 16. This lost-motion movement between link 16 and shaft 17 may therefore be used to cut the resistance coil 42 in or out of the electric circuit 43. By this means the manually controlled spark lever 10 may be moved a short distance in either direction for controlling the position of the movable switch contact 40 regardless of whether the lever 12 is set at fully advanced spark, fully retarded spark, or at any intermediate position. The electric circuit leading to the headlights of the vehicle is connected in series with the binding posts 39 as shown by the wires 43 in Fig. 7. The coil 42 has such a resistance that when it is cut into series with the headlights the lights will be suitably dimmed. It is therefore obvious that the driver may either dim or brighten his headlights by a small motion of the manual lever 10 without affecting the position of the spark control lever 12, and this is so regardless of the degree of advance or retard of the spark lever. By a continued motion of hand lever 10 the spark lever 12 is controlled. After lever 12 is set in the desired position the lights may be made either dim or bright (as the case may be) simply by backing up a small distance with hand lever 10.

An important feature of the invention is that the unit 20 is made to replace some short lever ordinarily found in the mechanical linkage between the hand lever 10 and the spark lever 12. It will therefore be a very simple matter to substitute the unit 20 for the short lever which is standard on the car, no other changes being required except to properly connect the headlight circuit through the posts 39. Of course the unit 20 may be designed to replace any lever found in said mechanical linkage, for instance, in the layout shown in Fig. 7 it may replace either lever 14 or lever 19. Preferably however the unit 20 is designed to replace the lever which will make the wiring to posts 39 the simplest in any given case. It will be noted that in any case the inconvenience of running the wiring up the steering column is avoided.

While the form of embodiment of the present invention as herein disclosed, constitutes a preferred form, it is to be understood that other forms might be adopted, all coming within the scope of the claims which follow.

What is claimed is as follows:

1. In combination with an internal combustion engine having a spark control and manual means having interconnection therewith for operating said spark control, said interconnection having a lost-motion movement which permits a certain movement of said manual means without changing said spark control, an electric circuit having an electric switch therein, said switch being operable by said lost-motion movement of said manual means.

2. In combination with an internal combustion engine having a spark control and manual means having interconnection therewith for operating said spark control, said interconnection having a lost-motion movement which permits a certain movement of said manual means from any position in its range of movement without changing said spark control, an electric circuit having an electric switch therein, said switch being operable by said lost-motion movement of said manual means.

3. In combination with an internal combustion engine having a spark control and manual operating means therefor, said manual means having a relatively small lost-motion movement which does not affect the spark control, an electric circuit having an electric switch associated therewith, and means for causing the lost-motion movement of said manual means to operate said electric switch.

4. In combination with an internal combustion engine having a spark control and manual operating means therefor, said means including a lever pivoted upon a second lever and having a small relative movement thereon thus giving a lost-motion movement to said manual means, an electric circuit having a switch associated therewith, said switch being operable by the relative movement between said levers.

5. In an automotive vehicle having an internal combustion engine and an electric light, in combination, an ignition spark control for said engine, manual means for operating said spark control, said manual means having a lost-motion movement which does not affect the spark control, and an electric switch for controlling said electric light, said switch being operable by the lost-motion movement of said manual means, whereby said light and ignition spark may be controlled by the same manual means.

6. In an automotive vehicle having an internal combustion engine and an electric light, in combination, an ignition spark control for said engine, manual means for operating said spark control, said manual means having a lost-motion movement throughout its range of movement which does not affect the spark control, and an electric switch for controlling the said electric light, said switch being operable by the lost-motion movement of said manual means, whereby said light and ignition spark may be controlled by the same manual means.

7. In combination, an automotive vehicle having an internal combustion engine and an electric light, a spark timer for said engine, manual means for controlling said timer to vary the time of the spark, said manual means having a lost-motion movement which does not vary the time of the spark, and an electric switch for controlling said electric light, said switch being operable by the lost-motion movement of said manual means.

8. In combination, an automotive vehicle having an internal combustion engine and an electric light, a spark timer for said engine, an electric switch for controlling said electric light, and common manual control means for controlling both the switch and the timer, said manual control means having a movement for controlling said switch without affecting said timer.

9. In combination with a rotatable shaft and a reciprocable rod, an electric switch unit built in the form of a lever and having means for non-rotatable attachment to said shaft and other means for attachment to said rod whereby said unit serves as a connecting link between said shaft and rod, said electric switch being operable by the transmission of motion between the shaft and rod through said switch unit acting as a lever.

10. In a mechanical linkage for transmitting motion, in combination, a lever fixed to a movable link, a second lever pivotally mounted upon said first lever and having a limited relative motion thereupon, said second lever being adapted to operate said first lever after the limited relative motion has taken place, and an electric switch operable by the relative motion between the two levers, whereby said second lever may be used to operate said switch without moving said movable link.

In testimony whereof I hereto affix my signature.

HARVEY D. GEYER.